United States Patent
Hicks et al.

(10) Patent No.: US 10,474,511 B1
(45) Date of Patent: *Nov. 12, 2019

(54) SYSTEMS AND METHODS FOR DELIVERING IN-APPLICATION MESSAGES

(71) Applicant: Braze, Inc., New York, NY (US)

(72) Inventors: Matthew Hicks, New York, NY (US); Jared Poelman, Long Island City, NY (US); Brian Wheeler, Brooklyn, NY (US); Ian Leue, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,557

(22) Filed: Jul. 16, 2019

Related U.S. Application Data

(63) Continuation of application No. 16/367,187, filed on Mar. 27, 2019, now Pat. No. 10,387,222.

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
*H04L 12/58* (2006.01)
*G06F 17/24* (2006.01)

(52) U.S. Cl.
CPC .............. *G06F 9/54* (2013.01); *G06F 17/248* (2013.01); *H04L 51/043* (2013.01); *H04L 51/046* (2013.01)

(58) Field of Classification Search
None
See application file for complete search history.

(56) References Cited

U.S. PATENT DOCUMENTS

| | | |
|---|---|---|
| 2013/0086178 A1 | 4/2013 | Osborne et al. |
| 2017/0220240 A1 | 8/2017 | Kataria et al. |
| 2018/0255159 A1 | 9/2018 | Cohen et al. |

OTHER PUBLICATIONS

Carvell, How to build a Kick-Ass Notifications System, mobilegrowthstack.com, Oct. 2017, 14 pages.
Sarto, Knack: Emails and Notifications, Dec. 2018, 12 pages.

*Primary Examiner* — Diem K Cao
(74) *Attorney, Agent, or Firm* — FisherBroyles, LLP

(57) ABSTRACT

Systems and methods for sending an in-application message to a user of a software application makes use of templated messages. User-specific information is added to the template to create the message delivered to the user. The user-specific information is added to the template to create the message immediately before the message is to be delivered to the user to ensure the user-specific information is as up-to-date as possible.

19 Claims, 8 Drawing Sheets

SYSTEMS AND METHODS FOR DELIVERING IN-APPLICATION MESSAGES

This application is a continuation of U.S. application Ser. No. 16/367,187, which was filed on Mar. 27, 2019, the contents of which are hereby incorporated by reference.

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. The present invention is focused on delivering in-application messages to users.

Companies also often engage a customer engagement service to help manage the delivery messages to their customers. The customer engagement service can help control the flow and timing of messages to provide the customers with an enjoyable and informative experience. For example, some customers that are highly engaged with a company may wish to receive messages from the company on a frequent basis. Conversely, customers that are not highly engaged with the company may find frequent messages from the company undesirable. The customer engagement service can help determine what individual customers desire, and then manage the flow of messaging to customers based on their individual desires.

Similarly, some customers may welcome the delivery of messages via push notifications, whereas other customers find push notifications intrusive and undesirable. The customer engagement service can help determine the individual customers' preferences for how they wish to receive messaging, and then ensure that the customers receive messages according to their delivery channel preferences.

The customer engagement service can also cause messages to be delivered to customers at opportune times when the messaging may have the most influence over customer behavior. Similarly, the customer engagement service may know when certain types of message will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

A customer engagement service hired by a company can control the flow and timing of the delivery of in-app messages. Indeed, the customer engagement service may deliberately coordinate the in-app messages with the delivery of messages sent to the customers via alternate delivery channels to help improve the customers' overall experience.

The in-app messages that are delivered to a customer may be personalized in various fashions based on known customer characteristics, customer preferences, demographic data, and perhaps location data.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future. That said, the following description focuses on in-app messages that are delivered to a user via a client's software application.

Figure 1:
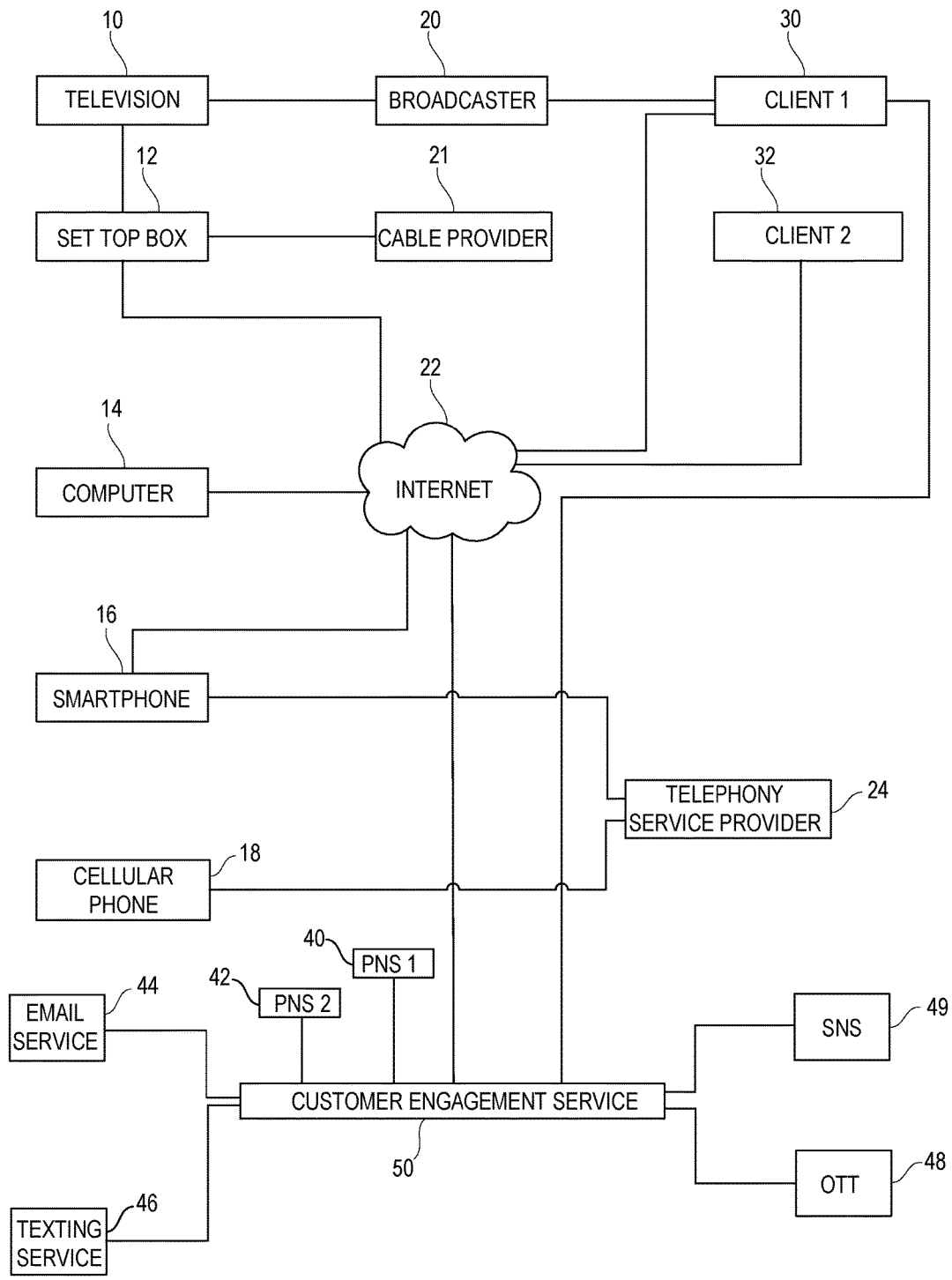
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
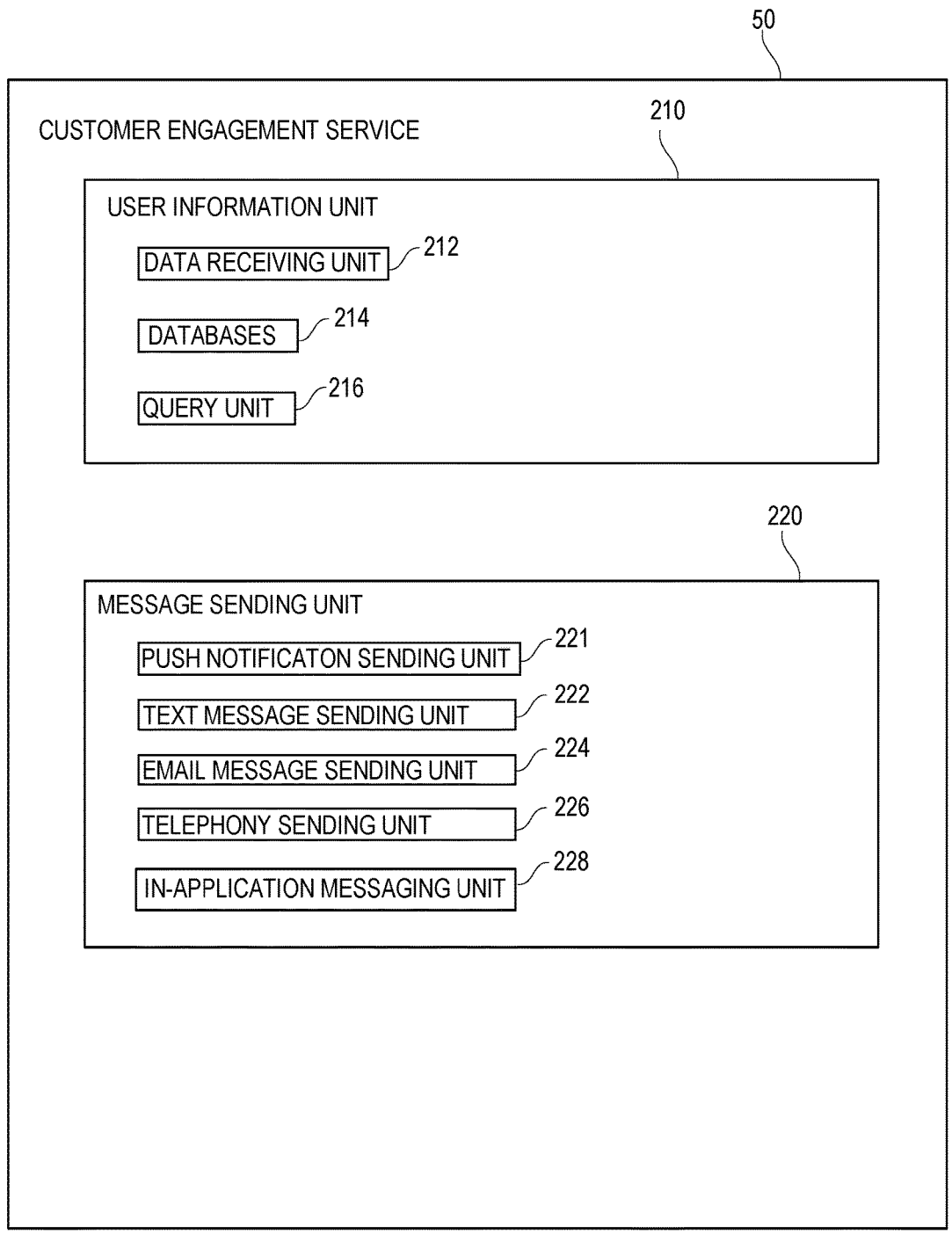
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device, as will be explained in detail below.

Figure 3:
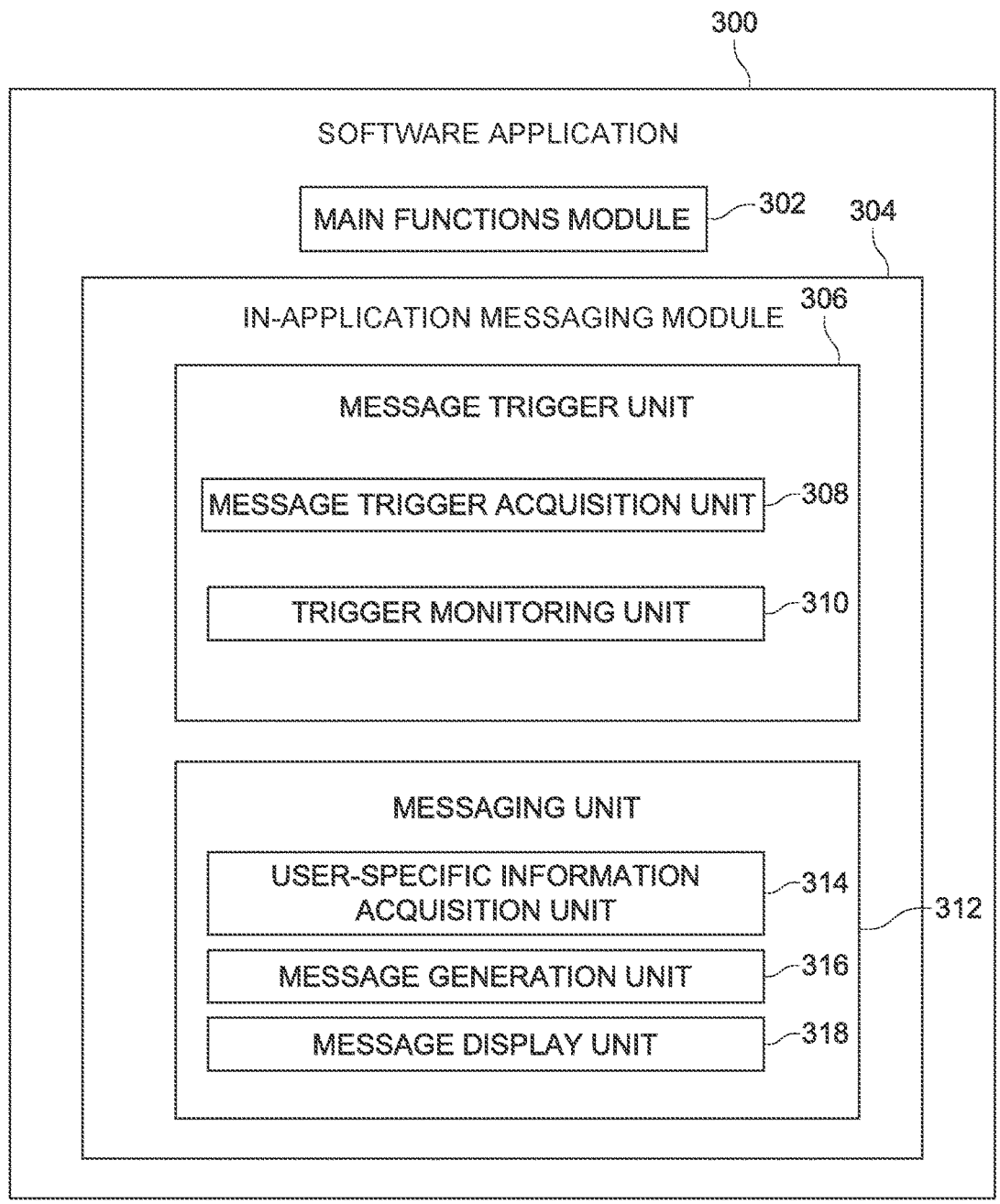
FIG. 3 is a diagram illustrating various elements of a company's software application that is provided to the company's customers.

FIG. 3 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application also includes an in-application messaging module 304. The in-application messaging module 304 is responsible for causing messages to be displayed or played to the user via the software application 300. A display message would be displayed to the user, whereas a video message would be played to the user.

In in-application messaging module 304 includes a messaging unit 312 that is configured to cause a message to be played or displayed to the user when one or more trigger conditions are satisfied. A message trigger acquisition unit 308 of a message trigger unit 306 communicates with the in-application messaging unit 228 of a customer engagement service 50 to obtain information about the trigger conditions under which a message is to be displayed/played to the user. A trigger monitoring unit 310 monitors those conditions to determine when the trigger conditions have been satisfied such that it is time to display/play a particular message to the user.

The messaging unit 312 that is responsible for causing an in-application message to be displayed/played to the user obtains all or portions of the in-application message from the in-application messaging unit 228 of the customer engagement service 50. In some instances, a message generation unit 316 may generate the in-application message using a message template and acquired information. In other instances, the messaging unit 312 may obtain the entire message that is to be displayed or played to a user from the in-application messaging unit 228 of the customer engagement service 50, from the client that provided the software application 300, or from a third party. Regardless of whether the in-application message is obtained or generated, a message display unit 318 causes the in-application message to be displayed/played to the user.

In some instances, a user-specific information acquisition unit 314 obtains user-specific information about the user, and the message generation unit 316 then generates a message using the obtained user-specific information.

As mentioned above, the message that is ultimately displayed/played to the user may be generated using a message template. The message template can be created by the client that provided the software application 300, or by the customer engagement service 50. In simple examples, a message template is configured such that customer-specific information, or other forms of information, can be inserted into the message template to generate a personalized or customized message.

A message template can also include sections that will be completed or filled in by evaluating conditional statements or boolean logic-based statements. The conditional statements or boolean logic-based statements can seek information from the customer engagement service, the client that provided the software application or from a third-party source in order to determine whether and/or how to complete a portion of a message template to thereby generate a message that can be played to displayed to a user.

For example, a portion of the message template may call for an image to be displayed, where the image is intended to represent the prevailing weather at the user's present location. For this to work, conditional statements or boolean-logic-based statements in this portion of the message template are used to determine where the user is presently located, and then the prevailing weather at that location. Then, based on the prevailing weather, a suitable image is obtained and inserted into the message.

The way in which a message trigger is satisfied may also be relevant and used to determine what information to insert into a message template to generate a message that will be displayed or played to the user. For example, if the message trigger is the user playing a video, the type of video that the user played may be used to determine how to generate the message that is ultimately generated and displayed or played to the user. As a result, when the user-specific information acquisition unit 314 requests user-specific information that is needed to generate a message, that request may provide information about how the message trigger was satisfied. The entity that then provides the user-specific information may use the information about how the trigger was satisfied to determine what sort of user-specific information to provide back to the user-specific information acquisition unit 314.

The message trigger itself may include conditional statements or boolean logic-based statements that control what happens when a message trigger is satisfied. For example, if the message trigger is the user playing a video, the message trigger could further specify that if the user played a video relating to sports, the user-specific information acquisition unit 314 should seek user-specific information from entity X, whereas if the user plays a video relating to nature, the user-specific information acquisition unit 314 should seek user-specific information from entity Z.

The conditional statements and boolean logic-based statements within a message template can even determine whether a message is to be displayed or played to the user. For example, a message template may include a conditional statement or boolean logic-based statement that indicates that under certain conditions the message should be displayed to the user, and under certain other conditions the message should not be displayed to the user.

Because of the message triggers and the message templates can utilize conditional statements and boolean logic-based statements to determine whether and how to generate a message for a user, highly sophisticated personalization for individual users can be achieved. Personalization that goes far beyond simply inserting user-specific characteristics or data (such as their name or address) into a message template.

The following description and claims refer to information specific to a user, or user-specific information. Those phrases are intended to encompass simple user characteristic data, such as the user's name and physical characteristics. However, those phrases are also intended to encompass data that is obtained or determined or generated by evaluating conditional statements or boolean logic-based statements within a message template or message trigger. Evaluating the conditional statements and/or boolean logic-based statements may require using simple user characteristics to determine whether and how to generate the message for the user. However, in other instances, no user characteristic data may be needed to evaluate a conditional statement or boolean logic-based statement. Regardless, for purposes of the following discussion, the phrases information specific to a user and/or user-specific information is intended to encompass data that is obtained or determined or generated by evaluating conditional statements or boolean logic-based statements within a message template or message trigger.

In prior art systems and methods, when the software application 300 was first run on the client's computing device, the in-application messaging module 304 of the software application 300 would request information about one or more in-application messages that could potentially be displayed/played to the user. Such a request would be directed to the in-application messaging unit 228 of the customer engagement service 50. The in-application messaging unit 228 of the customer engagement service 50 would then generate one or more messages using user-specific information about the user available in the databases 214 of the user information unit 210. Those messages, and information about corresponding trigger conditions under which the messages are to be displayed/played to the user, would then be sent back to the in-application messaging module 304 of the software application 300.

The trigger monitoring unit 310 would then monitor the trigger conditions to determine when the trigger conditions for any of the messages are satisfied. If the trigger conditions for one of the messages is satisfied, then the message display unit 318 would cause the message received upon startup of the software application 300 to be displayed/played to the user.

The inventors realized that a significant amount of time could elapse between startup of the software application 300, which is when the messages are created by the in-application messaging unit 228, and the moment when the trigger conditions for the message are satisfied and the message is displayed/played to the user. As a result, one or more items of the user-specific information that was used to create the message could have changed before the message is actually displayed/played to the user. To overcome this drawback, the inventors created a new way of delivering in-application messages to users through a client's software application that result in more up-to-date user-specific information being used to generate the in-application message that is ultimately displayed/played to the user. Details to the new systems and methods are discussed below in conjunction with the flowcharts depicted in FIGS. 4-7.

In some of the new systems and methods, the user-specific information acquisition unit 314 of the messaging unit 312 obtains up-to-date user-specific information only after the trigger conditions associated with a message are satisfied. The up-to-date user-specific information could be obtained from the databases 214 of a customer engagement service 50. Alternatively, the up-to-date user-specific information could be obtained from user information databases maintained by the client that provided the software application 300, or from some other third-party source. The message generation unit 316 then uses the obtained up-to-date user-specific information, and possibly a template for the message, to generate the in-application message that is displayed/played to the user. The message display unit 318 causes the generated in-application message to be displayed/played to the user.

In other embodiments, the messaging unit 312 may request an up-to-date in-application message from the in-application messaging unit 228 of the customer engagement service 50 after the trigger conditions for the message are satisfied. The in-application messaging unit 228 would then generate a message using up-to-date user-specific information obtained from the databases 214 of the customer engagement service 50, or from the client that provided the software application, or from a third-party source. The in-application messaging unit 228 would then generate an in-application message using the up-to-date user-specific information and send that up-to-date in-application message to the messaging unit 312. The message display unit 318 then causes the received in-application message to be displayed/played to the user.

In either of the alternatives outlined above, up-to-date user-specific information is used to generate the in-application message that is ultimately played to the user. As noted above, conditional statements and/or boolean logic-based statements may be present in a message template, and those conditional statements and/or boolean logic-based statements may need to be evaluated to determine whether and how to generate a message that is to be displayed or played to the user. In methods embodying the invention, such conditional statements and/or boolean logic-based statements are only evaluated once a message trigger has been satisfied, using then current information. These techniques allow systems and methods embodying the invention to overcome the drawbacks of prior art systems and methods for delivering such an in-application message to a user.

Figure 4:
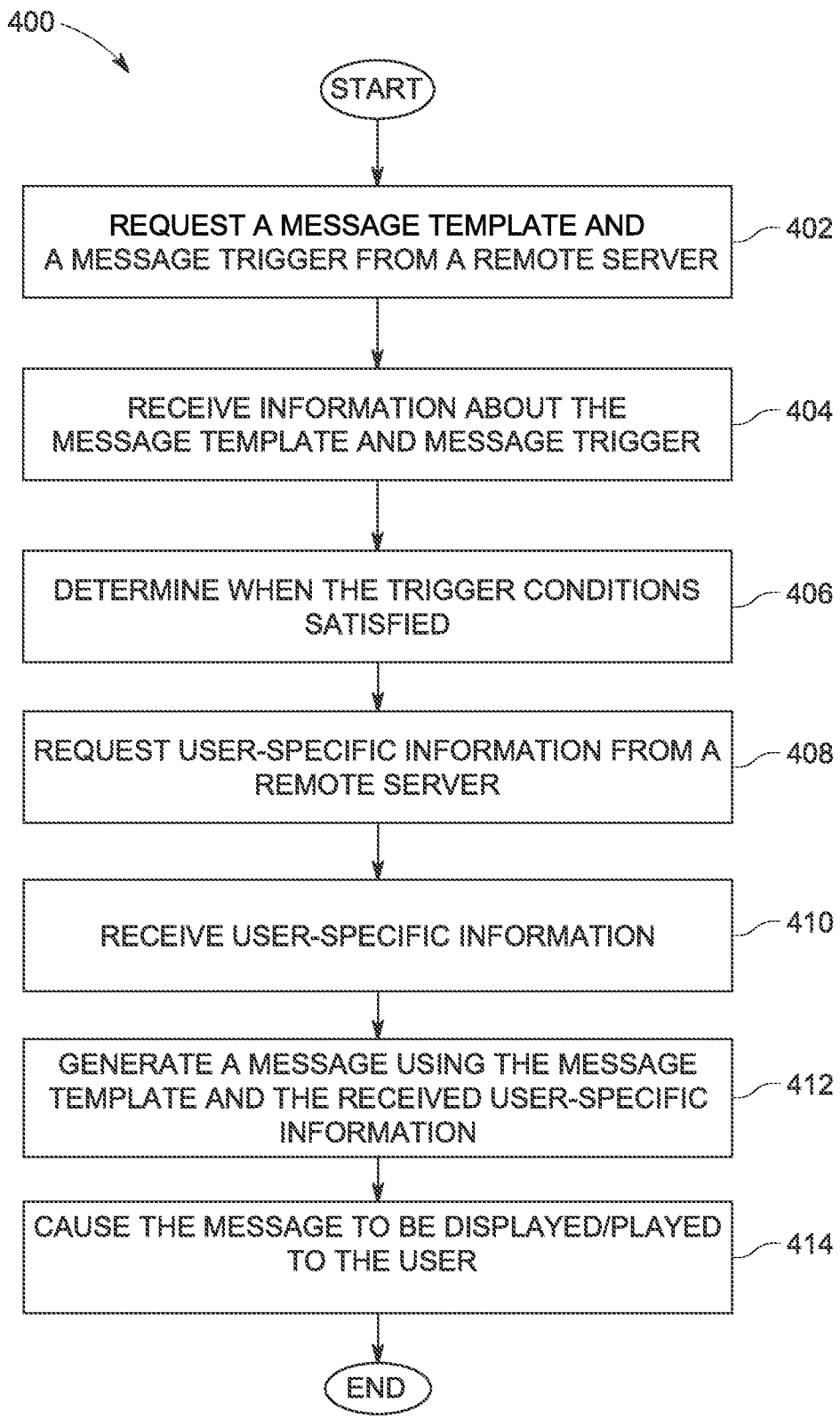
FIG. 4 is a flowchart illustrating steps of a first method embodying the invention that would be performed by elements of a company's software application.
Figure 5:
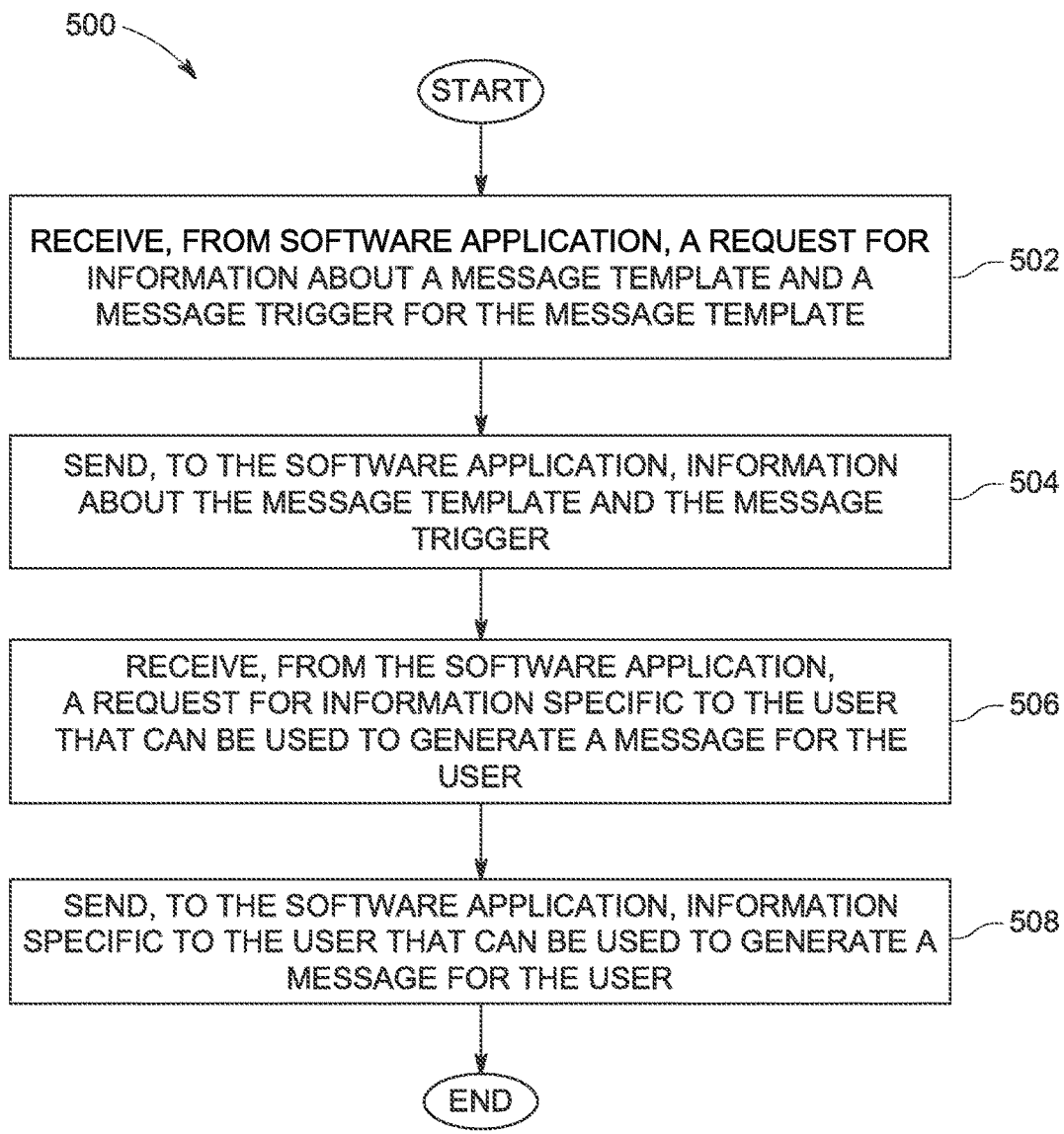
FIG. 5 is a flowchart illustrating steps of another method embodying the invention that would be performed by elements of a customer engagement service.

As is apparent from the description provided above, the process of generating and delivering an in-application message to a user via a client's software application requires the coordinated efforts of elements of the customer engagement service 50 and elements of the client's software application 300. FIG. 4 depicts a flowchart that shows the actions of the in-application messaging module 304 of the client's software application 300 during this process, according to a first way of operating. FIG. 5 illustrates a flowchart that shows the actions of elements of the customer engagement service 50 during this process, according to this first way of operating. Thus, FIGS. 4 and 5 will be used together to describe this process, according to the first way of operating.

It is also worth noting that in order to enable the client's software application 300 to operate as outlined above, the client's software application 300 incorporates software provided by the customer engagement service 50. Modification of the client's software application 300 could be performed by the client or by the customer engagement service 50 using a software development kit (SDK) provided by the customer engagement service 50, or via alternate means. Once the client's software application 300 has been modified so that it can interact with the customer engagement service 50 to deliver in-application messages to the user of the software application 300, the software application 300 may make calls to an application programming interface (API) provided by the customer engagement service 50 to obtain various items of information from the customer engagement service 50.

The method depicted in FIGS. 4 and 5 begins when a client's software application 300 is first run by a user on one of the user's computing devices. One of the startup functions performed by the software application 300, as illustrated in step 402, is for the in-application messaging module 304 of the software application 300 to request a message template for a message and information about trigger conditions for the message from the in-application messaging unit 228 of the customer engagement service 50. As noted above, a message template could include blank portions that are to be filled with customer-specific information, which allows the message to personalized or customized for the user. A message template could also include sections that will be completed or filled in by evaluating conditional statements or boolean logic-based statements. The conditional statements or boolean logic-based statements can seek information from the customer engagement service, the client that provided the software application or from a third-party source in order to determine whether and/or how to complete that portion of the message template.

As also noted above, conditional statement and/or boolean logic-based statements could determine whether a message is to be displayed to the user. For example, a message template may include a conditional statement or boolean logic-based statement that indicates that under certain conditions the message should be displayed to the user, and under certain other conditions the message should not be displayed to the user.

Next, in step 502 of the method illustrated in FIG. 5, the in-application messaging unit 228 of the customer engagement service 50 receives the request from the in-application messaging module 304. The in-application messaging unit 228 identifies a message that is to be delivered to the user of the software application, and in step 504 the in-application messaging unit 228 sends a template for the message to the messaging unit 312 of the software application 300. The in-application messaging unit 228 also sends information about trigger conditions for the message to the message trigger acquisition unit 308 of the software application 300.

Next, in step 404 of the method illustrated in FIG. 4, the messaging unit 312 receives the message template and the message trigger acquisition unit 308 receives the information about the trigger conditions for the message. The trigger monitoring unit 310 then monitors the trigger conditions until, in step 406, the trigger monitoring unit 310 determines that the message trigger conditions have been satisfied.

Next, in step 408, the user-specific information acquisition unit 314 requests user-specific information from one or more remote servers. That request could also include information about the trigger event that just transpired, such as how the message trigger was satisfied. The user-specific information sought will depend on the message template.

For example, in some instances the user-specific information acquisition unit 314 could be seeking simple user characteristic data, such as a user's name or address. In other instances, the user-specific information acquisition unit 314 may need to evaluate one or more conditional statements or boolean logic-based statements to determine what user-specific information to request, or where to direct such a request. Evaluating a conditional statement or a boolean logic-based statement may require obtaining one or more first items of information and using those first items of information to evaluate the conditional statement or boolean logic-based statement. Once that has been accomplished, the result may cause the user-specific information acquisition unit 314 to then seek out additional information that ultimately will be used to generate the message that is to be displayed or played to the user. Thus, the process of obtaining user-specific information that is to be inserted into a single portion of a message template may be a multi-step process that requires the user-specific information acquisition unit 314 to interact with multiple data sources to arrive that the information or data that is ultimately inserted into the single portion of the message template. As noted above, the evaluation of these conditional statements and/or boolean logic-based statements would only be performed after the message trigger has been satisfied, using then-current information.

When the user-specific information acquisition unit 314 requests data to help generate a message, the remote server to which the information request is directed could be the server hosting the in-application messaging unit 228 of the customer engagement service 50. Alternatively, the request could be sent to a server hosting the user information unit 210 maintained by the customer engagement service 50. In other instances, the request could be directed to a remote server that hosts customer information databases maintained by the client that provided the software application 300. In still other instances, the request could be directed to a remote server of a third-party user information service.

Depending on the message trigger, the request that the user-specific information acquisition unit 314 sends for user-specific data may also include information about how the message trigger was satisfied. For example, a message template sent to the in-application messaging module 304 could have a trigger that indicates that the message should be displayed to the user after the user watches a video. When the user watches a video, the user-specific information acquisition unit 314 could send a request for information that also indicates which video the user just watched. And the type of information sent back to the messaging unit 312 for insertion into the message template could vary greatly depending on the nature of the video that the user just watched. In still other embodiments, conditional statements or boolean logic-based statements in the message template itself might result in the user-specific information acquisition unit 314 requesting different types of information, or directing the request to different sources, depending on the nature of the video that the user just watched.

For purposes of this explanation, we will assume that the user-specific information acquisition unit 314 directed the information request to a remote server maintained by the customer engagement service 50. As a result, in step 506 of the method illustrated in FIG. 5, the information request is received by the customer engagement service 50. Next, in step 508, an element of the customer engagement service 50 obtains the requested user-specific information and sends it to the user-specific information acquisition unit 314. At this point, the method illustrated in FIG. 5 would end, and the in-app message would ultimately be delivered to the user via the software application 300 without further involvement of the customer engagement service 50.

Next, in step 410, the user-specific information acquisition unit 314 of the software application receives the requested user-specific information. In step 412, the message generation unit 316 uses the message template and the user-specific information to generate the in-application message. Finally, in step 414, the message display unit 318 causes the in-application message to be displayed/played to the user. The method illustrated in FIG. 4 would then end.

In the foregoing description, only a single message template and associated information about trigger conditions was sent to the software application 300 during startup. In alternate embodiments, multiple message templates and associated information about trigger conditions could be sent to the software application 300 upon startup.

In addition, the in-application messaging module 304 of the software application 300 may request message templates and associated information about trigger conditions from the customer engagement service 50 at other times. For example, such a request might be sent from the in-application messaging module 304 to the customer engagement service 50 on a periodic basis. Also, an element of the software application 300 may be configured to cause such a request to be sent to the customer engagement service 50 upon the occurrence of a triggering event.

In still other embodiments, the in-application messaging unit 228 of the customer engagement service 50 may be configured to push message templates and associated information about trigger conditions to the in-application messaging module 304 of a software application 300. Thus, rather than waiting for a request from the software application 300, the in-application messaging unit 228 of the customer engagement service 50 may be capable of proactively sending such information to a client's software application 300.

Also, in the embodiment described above, the user-specific information acquisition unit 314 requested up-to-date user-specific information that was to be added to a message template to generate an in-application message. In alternate embodiments, the information acquired by the messaging unit 312 that is added to a message template to create an in-application message need not be specific to the user. Instead, it may be desirable to simply acquire up-to-date information unrelated to the user that is to be loaded into a message template to create an in-application message. Here again, the information obtained and used to create an in-application message could come from a variety of sources beyond databases maintained by the customer engagement service 50 of the client that provided the software application 300.

Figure 6:
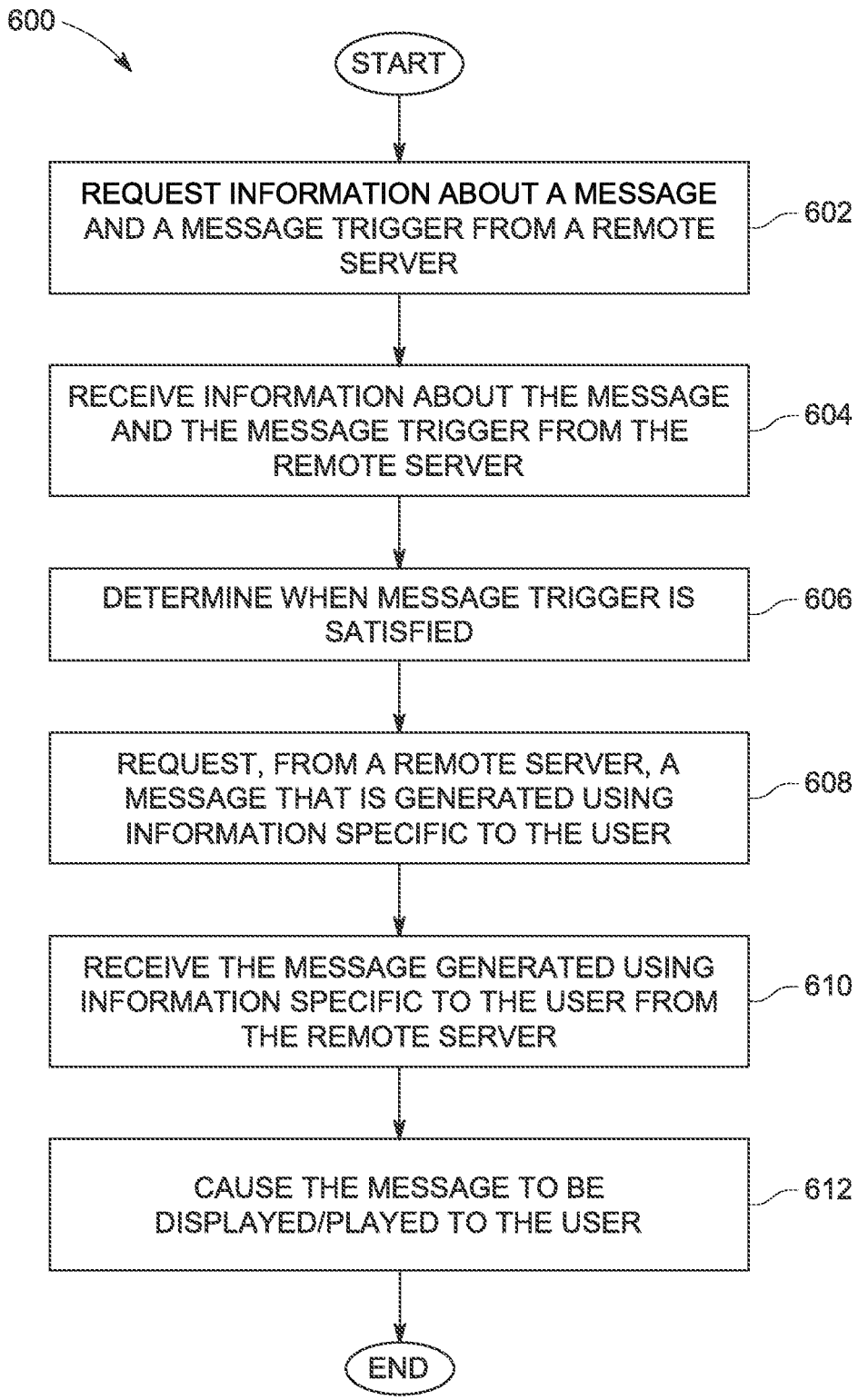
FIG. 6 is a flowchart illustrating steps of another method embodying the invention that would be performed by elements of a company's software application.
Figure 7:
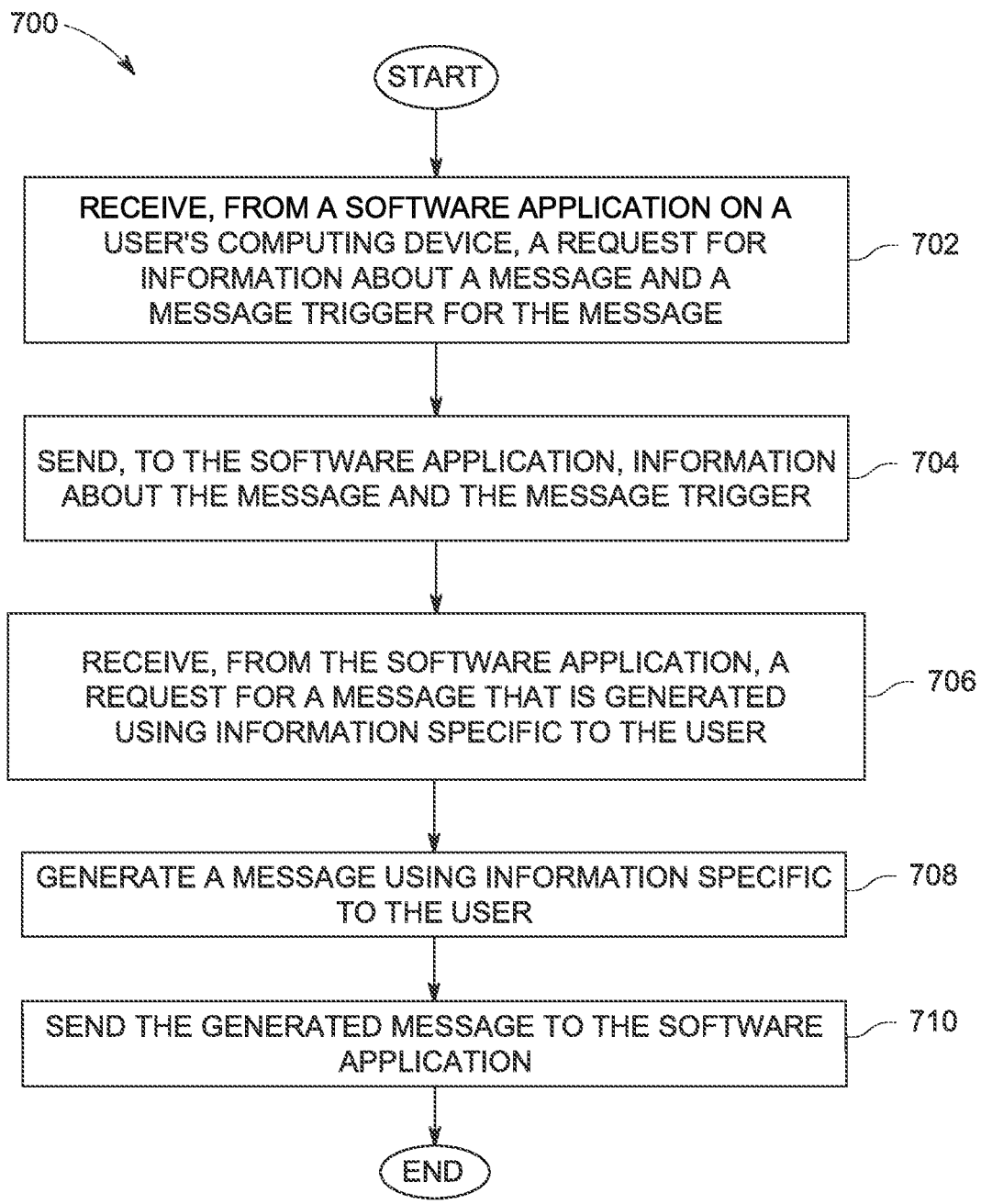
FIG. 7 is a flowchart illustrating steps of another method embodying the invention that would be performed by elements of a customer engagement service.

FIGS. 6 and 7 illustrate steps of methods for delivering in-application messages to users that operates somewhat differently from the one discussed above. FIG. 6 illustrates steps that would be performed by an in-application messaging module 304 of a client's software application 300. FIG. 7 illustrates steps of a method that would be performed by elements of a customer engagement service 50.

In this method, when the client's software application is first run, as part of the startup operations, in step 602, an in-application messaging module 304 of the software application 300 requests information about a message and trigger conditions for the message from a remote server. For purposes of this embodiment, we will assume that the request is sent to an in-application messaging unit 228 of a customer engagement service 50.

Next, in step 702 of the method illustrated in FIG. 7, the in-application messaging unit 228 receives the request sent by the in-application messaging module 304. The in-application messaging unit 228 identifies a message that is to be delivered to a user of the software application 300, and in step 704 the in-application messaging unit 228 sends information about the message to the messaging unit 312 and information about the associated trigger conditions to the message trigger acquisition unit 308 of the software application 300.

In step 604 of the method illustrated in FIG. 6, the message trigger acquisition unit 308 receives the information about the message trigger conditions, and the messaging unit 312 receives information about the message. Next, in step 606, the trigger monitoring unit 310 monitors the trigger conditions until it determines that the trigger conditions have been satisfied.

In step 608, the messaging unit 312 requests a message with up-to-date user-specific information from the in-application messaging unit 228 of the customer engagement service 50. The request may include information about how the trigger condition was satisfied. In step 706 of the method illustrated in FIG. 7, that request is received by the in-application messaging unit 228 of the customer engagement service 50. In step 708, the in-application messaging unit 228 generates a message with up-to-date customer-specific information. This up-to-date customer-specific information could be drawn from the databases 214 in the user information unit 210 of the customer engagement service 50, or from user information databases maintained by the client that provided the software application 300, or from other third-party sources. In step 710, the in-application messaging unit 228 sends the generated message to the messaging unit 312 of the software application 300. The method illustrated in FIG. 7 then ends, and the customer engagement service is not further involved in delivering the in-application message to the user of the software application 300.

In step 610 of the method illustrated in FIG. 6, the messaging unit 312 of the software application 300 receives the generated message. Then, in step 612, the message display unit 318 causes the generated message to be displayed or played to the user. The method illustrated in FIG. 6 then ends.

In the foregoing description, information about only a single message, and associated information about trigger conditions, was sent to the software application 300 during startup. In alternate embodiments, information about multiple messages and associated trigger conditions could be sent to the software application 300 upon startup.

In addition, the in-application messaging module 304 of the software application 300 may request information about one or more messages and associated trigger conditions from the customer engagement service 50 at other times. For example, such a request might be sent from the in-application messaging module 304 to the customer engagement service 50 on a periodic basis. Also, an element of the software application 300 may be configured to cause such a request to be sent to the customer engagement service 50 upon the occurrence of a triggering event.

In still other embodiments, the in-application messaging unit 228 of the customer engagement service 50 may be configured to push information about messages and associated trigger conditions to the in-application messaging module 304 of a software application 300. Thus, rather than waiting for a request from the software application, the in-application messaging module 228 of the customer engagement service 50 may be capable of proactively sending such information to a client's software application 300.

Also, in the embodiment described above, the in-application messaging unit 228 used user-specific information to generate the in-application message that is ultimately displayed/played to the user. In alternate embodiments, the information used to create an in-application message need not be specific to the user. Instead, it may be desirable to acquire up-to-date information unrelated to the user, and then use that information to generate the in-application message. Here again, the information obtained and used to create an in-application message could come from a variety of sources beyond databases maintained by the customer engagement service 50 of the client that provided the software application 300.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module" or "unit." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
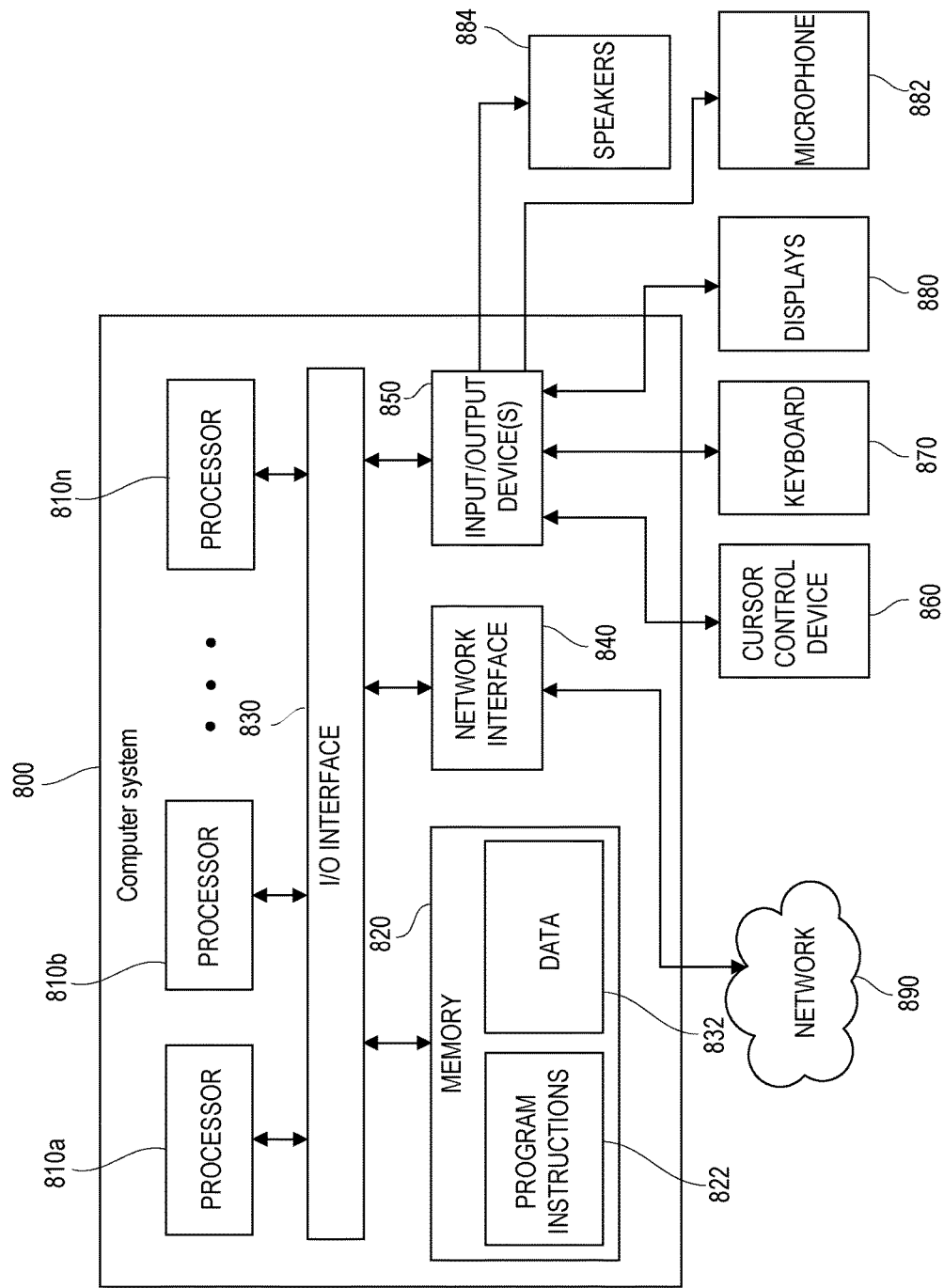
FIG. 8 is a diagram of a computer system and associated peripherals which could embody the invention, or which could be used to practice methods embodying the invention.

FIG. 8 depicts a computer system 800 that can be utilized in various embodiments of the present invention to implement the invention according to one or more embodiments. The various embodiments as described herein may be executed on one or more computer systems, which may interact with various other devices. One such computer system is the computer system 800 illustrated in FIG. 8. The computer system 800 may be configured to implement the methods described above. The computer system 800 may be used to implement any other system, device, element, functionality or method of the above-described embodiments. In the illustrated embodiments, the computer system 800 may be configured to implement the disclosed methods as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, display(s) 880, microphone 882 and speakers 884. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, the computer system 800 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing information for a message that is to be displayed or played to a user, comprising:
   receiving, from a software application on a user's computing device, a first request for information, where the first request for information comprises a request for information about a message and an associated message trigger for causing the message to be displayed or played to the user;
   sending information to the software application on the user's computing device in response to the first request, where the sent information includes information about the message and the message trigger;
   receiving, from the software application on the user's computing device, a second request for information, where the second request for information comprises a request for information specific to the user that can be used to generate the message for the user; and
   sending, to the software application on the user's computing device, information specific to the user that can be used to generate the message for the user.

2. The method of claim 1, wherein the information about the message trigger sent to the software application includes information about at least one condition that must be satisfied to cause the message to be displayed or played to the user.

3. The method of claim 2, wherein the at least one condition is the occurrence of an event.

4. The method of claim 2, wherein the at least one condition is the occurrence of a specific action that could be taken by the user.

5. The method of claim 1, wherein the information about the message sent in response to the first request includes a message template.

6. The method of claim 5, wherein the message template includes at least one logical statement that must be evaluated to determine how to generate the message that is to be displayed or played to the user.

7. The method of claim 5, wherein the message template includes at least one logical statement that must be evaluated to determine what information specific to the user to request in the second request.

8. The method of claim 1, wherein the second request for information includes information about how the message trigger was satisfied.

9. The method of claim 8, wherein the step of sending information specific to the user comprises sending information specific to the user that is based on how the message trigger was satisfied.

10. A system for providing information for a message that is to be displayed or played to a user, comprising:
    means for receiving, from a software application on a user's computing device, a first request for information, where the first request for information comprises a request for information about a message and an associated message trigger for causing the message to be displayed or played to the user;
    means for sending information to the software application on the user's computing device in response to the first request, where the sent information includes information about the message and the message trigger;
    means for receiving, from the software application on the user's computing device, a second request for information, where the second request for information comprises a request for information specific to the user that can be used to generate the message for the user; and means for sending, to the software application on the user's computing device, information specific to the user that can be used to generate the message for the user.

11. A system for providing information for a message that is to be displayed or played to a user, comprising:

one or more servers that are configured to perform a method comprising:

receiving, from a software application on a user's computing device, a first request for information, where the first request for information comprises a request for information about a message and an associated message trigger for causing the message to be displayed or played to the user;

sending information to the software application on the user's computing device in response to the first request, where the sent information includes information about the message and the message trigger;

receiving, from the software application on the user's computing device, a second request for information, where the second request for information comprises a request for information specific to the user that can be used to generate the message for the user; and sending, to the software application on the user's computing device, information specific to the user that can be used to generate the message for the user.

12. The system of claim 11, wherein the one or more servers are configured such that the information about the message trigger sent to the software application includes information about at least one condition that must be satisfied to cause the message to be displayed or played to the user.

13. The system of claim 12, wherein the at least one condition is the occurrence of an event.

14. The system of claim 12, wherein the at least one condition is the occurrence of a specific action that could be taken by the user.

15. The system of claim 11, wherein the one or more servers are configured such that the information about the message sent in response to the first request includes a message template.

16. The system of claim 15, wherein the message template includes at least one logical statement that must be evaluated to determine how to generate the message that is to be displayed or played to the user.

17. The system of claim 15, wherein the message template includes at least one logical statement that must be evaluated to determine what information specific to the user to request in the second request.

18. The system of claim 11, wherein the second request for information includes information about how the message trigger was satisfied.

19. The system of claim 18, wherein the one or more servers are configured such that the step of sending information specific to the user comprises sending information specific to the user that is based on how the message trigger was satisfied.

* * * * *